United States Patent [19]
Noguchi et al.

[11] Patent Number: 4,891,937
[45] Date of Patent: Jan. 9, 1990

[54] HEAT RECOVERY SYSTEM

[75] Inventors: Yoshiki Noguchi; Youichi Hattori, both of Hitachi, Japan

[73] Assignee: Hitachi, Ltd., Tokyo, Japan

[21] Appl. No.: 541,246

[22] Filed: Oct. 12, 1983

[30] Foreign Application Priority Data

Oct. 13, 1982 [JP] Japan ................................ 57-178357

[51] Int. Cl.$^4$ ................................................ F02G 1/00
[52] U.S. Cl. .................................................. 60/39.182
[58] Field of Search ............. 60/39.182, 39.511, 39.54, 60/39.58; 415/114, 115

[56] References Cited

U.S. PATENT DOCUMENTS

| | | | |
|---|---|---|---|
| 3,015,937 | 1/1962 | Giliberty | 60/39.511 |
| 3,150,487 | 9/1964 | Mangan et al. | 60/39.182 |
| 4,288,979 | 9/1981 | Lilsedahl et al. | 60/39.182 |
| 4,299,193 | 11/1981 | Dworschak | 122/7 R |
| 4,353,206 | 10/1982 | Lee | 60/39.182 |
| 4,424,668 | 10/1984 | Mukherjee | 60/39.182 |

FOREIGN PATENT DOCUMENTS

| | | | |
|---|---|---|---|
| 523998 | 8/1976 | U.S.S.R. | 60/39.182 |
| 679007 | 9/1952 | United Kingdom | 60/39.182 |

Primary Examiner—Louis J. Casaregola
Assistant Examiner—T. S. Thorpe
Attorney, Agent, or Firm—Antonelli, Terry & Wands

[57] ABSTRACT

A heat recovery system for taking out a mechanical energy from hot exhaust gas from a gas turbine comprises at least two exhaust-gas boiler each having drum of an interior pressure different from each other, a steam turbine, a generator driven by the steam turbine, steam condenser and a plurality of heat exchanger. The heat exchanger is disposed in advance of the drum of the respective exhaust-gas boiler so that a feed-water circulating through the heat recovery system is pre-heated before entering into each drum by means of a cooling water which is used to cool blades of the gas turbine and becomes very hot.

13 Claims, 9 Drawing Sheets

HEAT RECOVERY SYSTEM

BACKGROUND OF THE INVENTION

Field of the Invention

The present invention relates to a heat recovery system which is associated with an electric power plant employing a gas turbine.

SUMMARY OF THE INVENTION

Generally, in an electric power plant employing a gas turbine cooled by a cooling medium, e.g. a water-cooled gas turbine, the total efficiency of the electric power plant is materially increased by making an efficient use of a heat possessed in the cooling medium after cooling of rotor and stator blades of the gas turbine. That is, an increase in the total efficiency of the electric power plant depends on the extent of the utilization of the heat possessed in the cooling medium.

Accordingly, an object of the invention is to provide an improved heat recovery system which can increase the total efficiency of the electric power plant.

To this end, according to the invention, there is provided a heat recovery system in which a feed-water directed to an exhaust-gas boiler means is heated by a high-temperature exhaust gas from a gas turbine so that a heating load of other heat sources for heating the feed-water is decreased and, at the same time, a heat recovery by the feed water from the exhaust gas within a fuel economizer is decreased relatively. In consequence, an amount of vapor generated in a drum in the exhaust-gas boiler means is increased to materially improve the total efficiency of the electric power plant.

DETAILED DESCRIPTION

Figure 1:
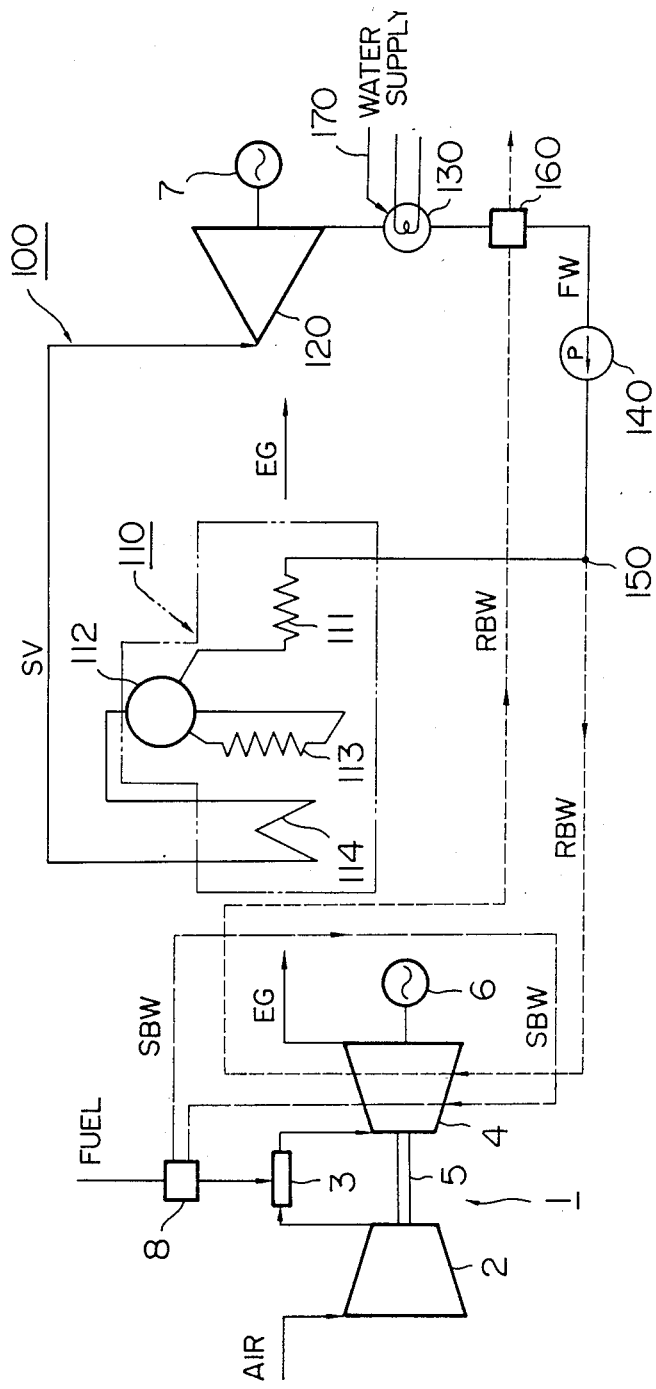
FIGS. 1 and 2 are block diagrams of conventional heat recovery systems associated with a water cooled gas turbine plant.

Referring now to the drawings wherein like reference numerals are used throughout the various views to designate like parts and, more particularly, to FIG. 1, according to this figure, a conventional heat recovery system includes a water-cooled gas turbine generally designated by the reference numeral 1 which includes a compressor 2, burner 3, and a gas turbine 4 connected to the compressor 2 through a shaft 5. In operation, air is introduced into and compressed in the compressor 2. The compressed air is then introduced into and mixed with a fuel in the burner 3 to form a mixture which is combusted in the burner 3. A resultant high-temperature combusted gas is then introduced into the turbine 4 thereby to drive the latter. A part of mechanical work made by the turbine 4 drives not only a generator 6 to produce an electric power, but the compressor 2 through the shaft 5. The high-temperature exhaust gas (EG) from the turbine 4 is delivered to a heat recovery system 100 which includes an exhaust-gas boiler means 110, a steam turbine 120, a steam condenser 130 and a pump 140. The exhaust gas (EG) is, more particularly, discharged outside of the heat recovering system 100 through the exhaust-gas boiler means 110 which includes a fuel economizer 111, a drum 112, an evaporator 113 and a superheater 114.

The medium flowing through the heat recovery system 100, i.e. water, is heated in the exhaust-gas boiler means 110 by the high-temperature exhaust gas (EG) to become superhheated vapor. The superheated vapor (SV) in turn is delivered to the steam turbine 120 to drive the same. The mechanical work of the steam turbine 120 is converted into electric energy through the generator 7. The vapor from steam turbine 120 is cooled and condensed in the condenser 130 to become liquid phase, e.g. water (FW) which is then pumped again to the exhaust-gas boiler means 110 through the pump 140.

In the gas turbine 4, the rotor blades and stator blades of the gas turbine are exposed to and heated by the high-temperature burnt gas. These blades, therefore, are adopted to be cooled by a cooling water. More specifically, the rotor blades of the gas turbine 4 are cooled by the water (RBW) branched out from a portion 150 between the exhaust-gas boiler means 110 and the pump 140 of the heat recovery system 100. Consequently, the water (RBW) is heated and delivered into a heat exchanger 160 disposed in a portion of the heat recovery system 100 between the steam condenser 130 and the pump 140. In the heat exchanger 160, the high-temperature water (RBW) heats the water (FW) from the condenser 130 and is then discharged outside of the heat recovery system 100. In the course of cooling of the rotor blades, the water (RBW) contacts not only the rotor blades but also the combusted gas, so that the water (RBW) may contain undesirable impurities. It is, therefore, not advisable to recirculate the water (RBW) in the heat recovery system 100 for repeated use and, hence, the water (RBW) has to be discharged outside of the heat recovery system 100. As a result, the amount of the water passing through the heat recovery system 100 is gradually decreased, so that a fresh water is supplied into the system 100 through a water supply passage 170.

The stator blades of the gas turbine 4 are cooled by water (SBW). The water (SBW) is also heated as a result of the cooling of the stator blades and delivered to a heat exchanger 8 in which the high-temperature water (SBW) heats the fuel to be supplied into the burner 3. The water (SBW) is forwarded to the stator blades of the gas turbine 4 again. During the cooling of the stator blades, the water (SBW) does not come into direct contact with the combusted gas, so that it is not contaminated by any impurity.

As will be clearly understood from the foregoing description, the water (RBW) for cooling the rotor blades flows through an open loop, so that a part of the heat possessed in the water (RBW) is wasted uneconomically. On the other hand, the water (SBW) for cooling the stator blades is recirculated through a closed loop, so that the heat possessed in the water (SBW) is almost fully recovered.

Figure 2:
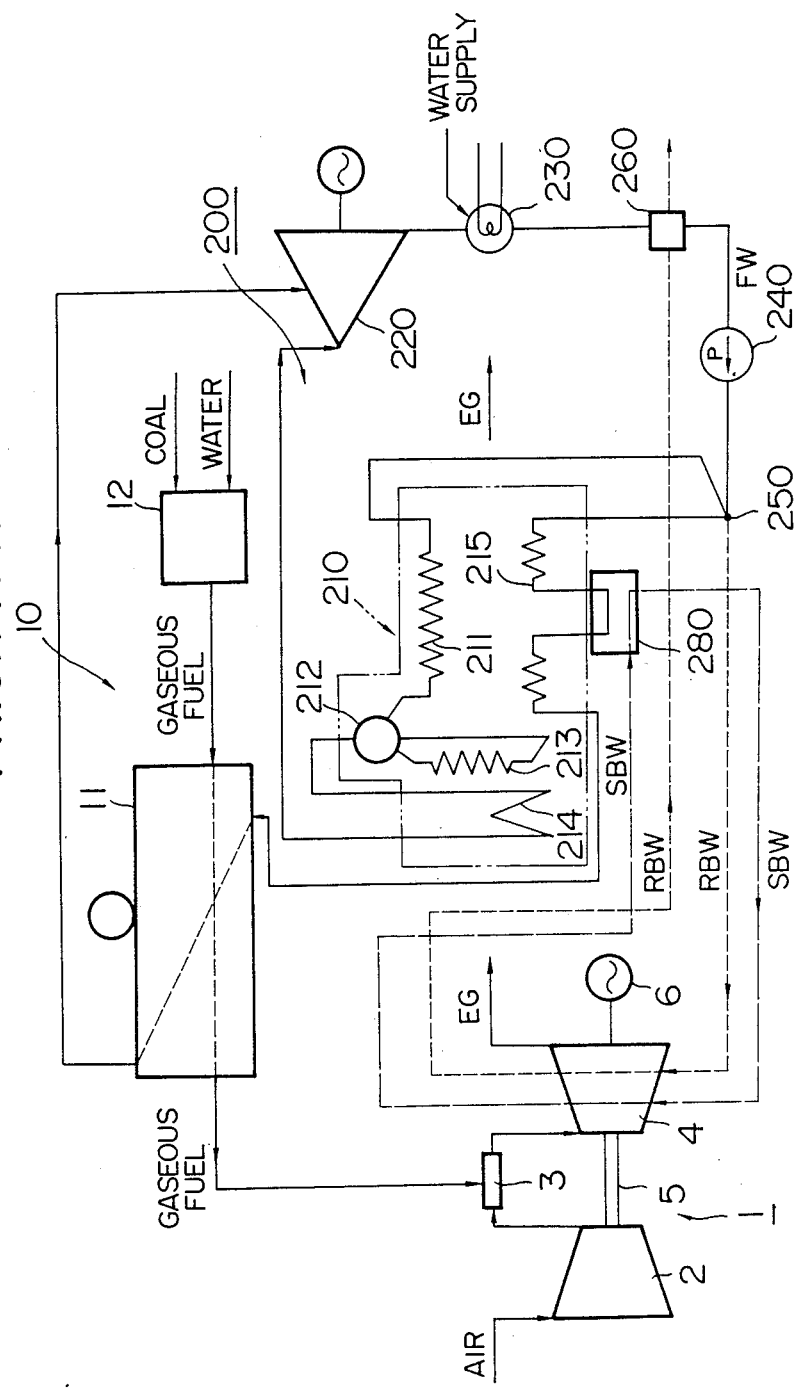

In FIG. 2, another conventional heat recovery system 200 associated with a combined electric power plant includes a water-cooled gas turbine plant 1 and a coal gasification plant 10. The coal gasification plant 10 includes a heat recovery boiler means 11 and a gasifier 12 which produces a gaseous fuel, i.e. gasified coal, from coal and water.

Generally, in the combined electric power plant having a coal gasification plant, it is necessary to heat the gaseous fuel to be supplied to the gas turbine not in the gas turbine plant, but in the coal gasification plant in order to obtain a high efficiency. Unlike the arrangement shown in FIG. 1, the heating of the gaseous fuel by the high-temperature water (SBW) after cooling of the stator blades is not necessary.

However, in case that the high-temperature water (SBW) heated by the stator blades of the gas turbine 4 is discharged outside of the combined electric power plant system, the heat loss in the plant is increased and the total efficiency of the combined electric power plant is lowered. In addition, the heat recovered from the high-temperature water (SBW) after cooling of the stator blades amounts to about 10% of the total amount of the recovered heat. Consequently, the efficiency of the electric power plant largely depends on the amount of heat recovered from the water (SBW).

The heat recovery system 200 associated with the combined electric power plant shown in FIG. 2 includes an exhaust-gas boiler means 210, a steam turbine 220, a steam condenser 230, and a pump 240. The high-temperature exhaust gas (EG) from the turbine 4 is discharged outside of the heat recovery system 200 through the exhaust-gas boiler means 210 which is composed of a primary fuel economizer 211, a drum 212, an evaporator 213, a superheater 214, and a secondary fuel economizer 215.

The heat recovery system 200 has a circulating line of the same construction as that in the heat recovery system 100 shown in FIG. 1 and an additional line. The additional line branches at a point 250 and extends therefrom to the steam turbine 220 through the secondary fuel economizer 215 and the heat recovery boiler means 11. The medium flowing through the additional line i.e., water is heated within the exhaust-gas boiler means 210 by the high-temperature exhaust gas (EG) as well as heated within a heat exchanger 280 provided at an intermediate portion of the secondary fuel economizer 215 by the water (SBW) heated by the stator blades of the gas turbine 4. The water from the heat exchanger 280 is further heated in the heat recovery boiler means 11 to become saturated vapor which, in turn, is supplied to the steam turbine 220 to drive the same. The line for the water (RBW) for cooling the rotor blades of the gas turbine 4 has a construction identical to that shown in FIG. 1.

In the arrangement shown in FIG. 2, the water flowing through the additional line is heated not only in the exhaust-gas boiler means 210 by the high-temperature exhaust gas (EG) but in the heat exchanger 280 by the water (SBW) which is heated by the stator blades of the gas turbine 4. Consequently, the amount of heat recovered from the exhaust gas within the secondary fuel economizer 215 is decreased. This, however, does not contribute to increase of the vapor generated in the drum 212 in the heat recovery sytem 200 because the heating of the gaseous fuel in the heat recovery boiler means 11 does not provide substantial increase in the coal gasification plant 10.

Figure 3:
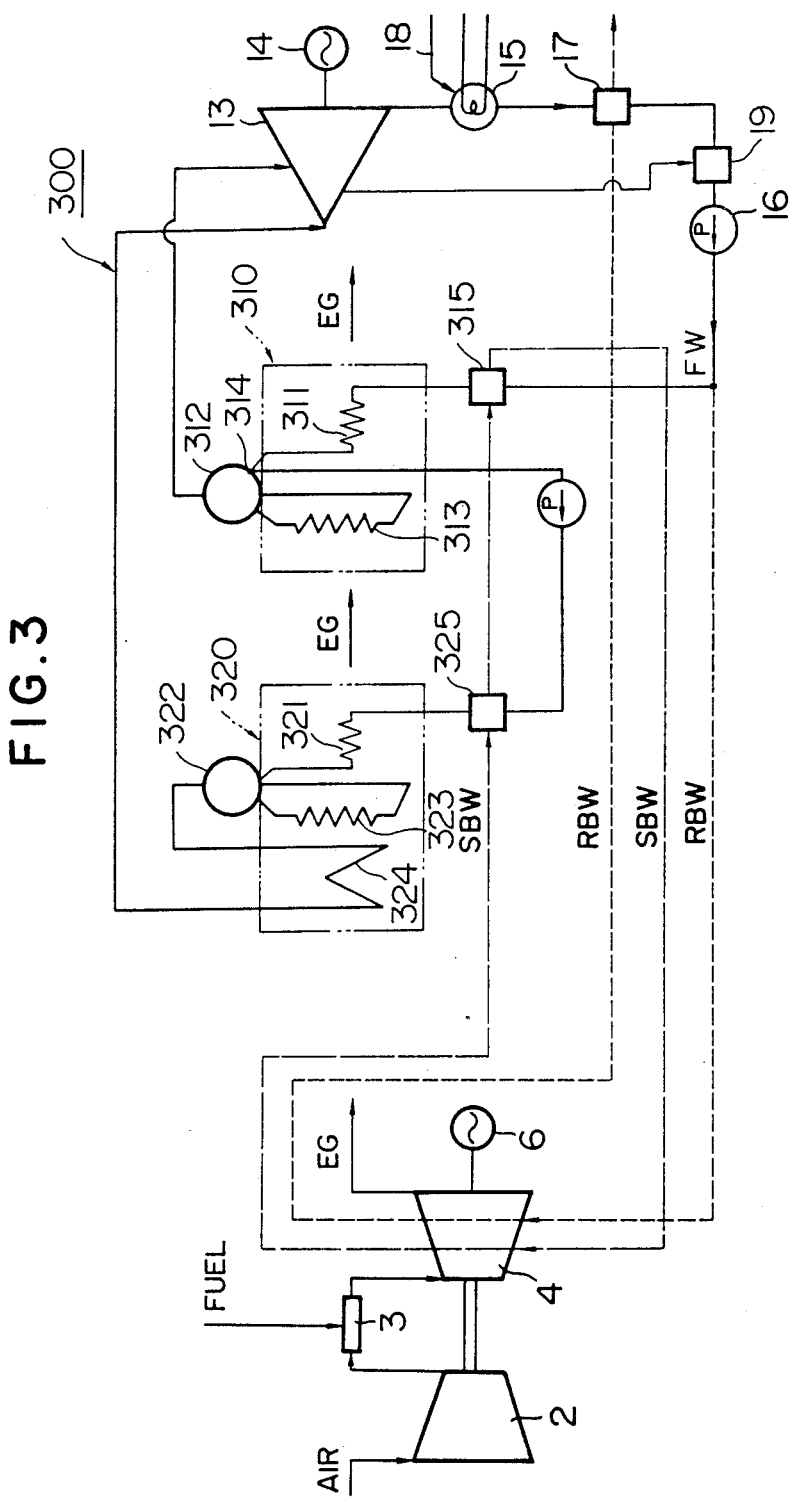
FIGS. 3 to 8 are block diagrams of different embodiments of the invention.

In FIG. 3, a heat recovery system 300 has a lower-pressure boiler means 310 including an economizer 311, a drum 312 having a lower interior pressure, and an evaporator 313, and a higher-pressure boiler means 320 including an economizer 321, a drum 322 having a higher interior pressure, an evaporator 323, and a superheater 324.

The feed-water (FW) recirculating through the heat recovery system 300 branches off at an outlet 314 of the economizer 311 into the drum 312 having a lower interior pressure and the drum 322 having a higher interior pressure through the economizer 321. The lower interior pressure and the higher interior pressure are, for example, about 10 Kg/cm$^2$ and 70 Kg/cm$^2$, respectively.

The steam generated in the higher interior pressure drum 322 is heated in the superheater 324 to become superheated steam which is then delivered into the mixed pressure steam turbine 13. On the other hand, the saturated steam generated in the lower interior pressure drum 312 is also delivered to the steam turbine 13. The superheated steam and the steam drive the steam turbine 13. The mechanical of the steam turbine 13 is converted into electric energy through the generator 14.

The steam from the steam turbine 13 is condensed into feed-water within the condenser 15 and the feed-water is pumped again to the boiler means 310, 320 by the pump 16.

The rotor blades of the gas turbine 4 are cooled by the feed-water (RBW) branching off from the heat recovery system 300, while the stator blades of the same are cooled by the circulating cooling water (SBW). The high-temperature cooling water (RBW) heated by the rotor blades is used to heat the feed-water (FW) in a heat exchanger 17 and is then discharged outside of the heat recovery system 300. In order to make up loss of feed-water due to the discharge of the water (RBW) a fresh water is supplied into the heat recovery system 300 through a water supply line 18. The high-temperature cooling water (SBW) heated by the stator blades heats the feed-water in a heat exchanger 325 disposed in advance of the economizer 321 associated with the higher interior pressure drum 322. The cooling water (SBW) from the heat exchanger 325 also heats the feed-water in the heat exchanger 315 disposed in advance of the economizer 311 associated with the lower interior pressure drum 312. Since the feed-water is heated within the heat exchanger 325 by the cooling water (SBW), the amount of the steam generated within the higher interior pressure drum 312 is increased. Furthermore, since the feed-water is heated within the heat exchanger 315 by the cooling water (SBW) from the heat exchanger 325, the heating load imposed on other heat source for heating the feed-water, such as the heating load imposed on the extraction steam in a bleeder feed-water heater 19 from the steam turbine 13, is advantageously decreased.

Figure 4:
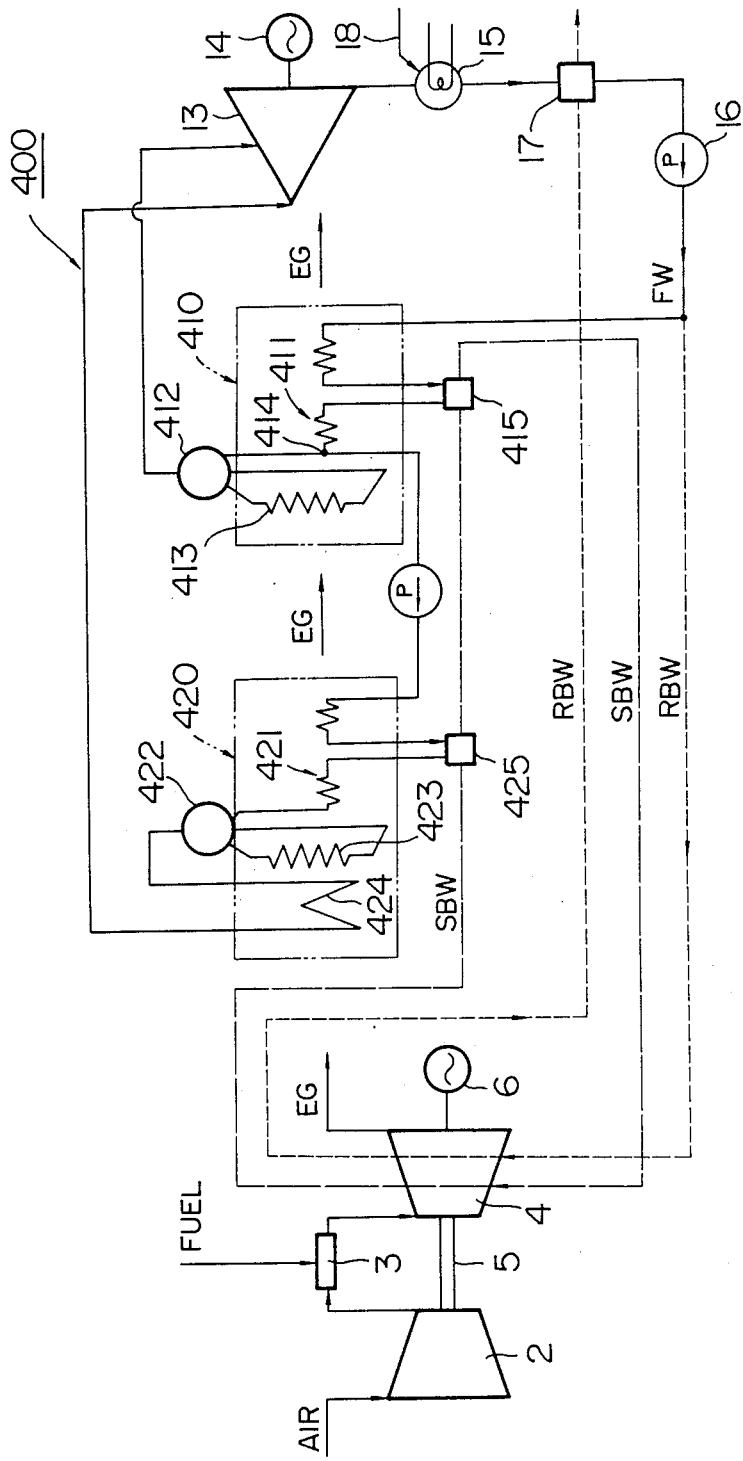

As shown in FIG. 4, heat exchangers 415 and 425 for heating the feed-water are respectively disposed at intermediate portions of the economizers 411 and 421.

Figure 5:
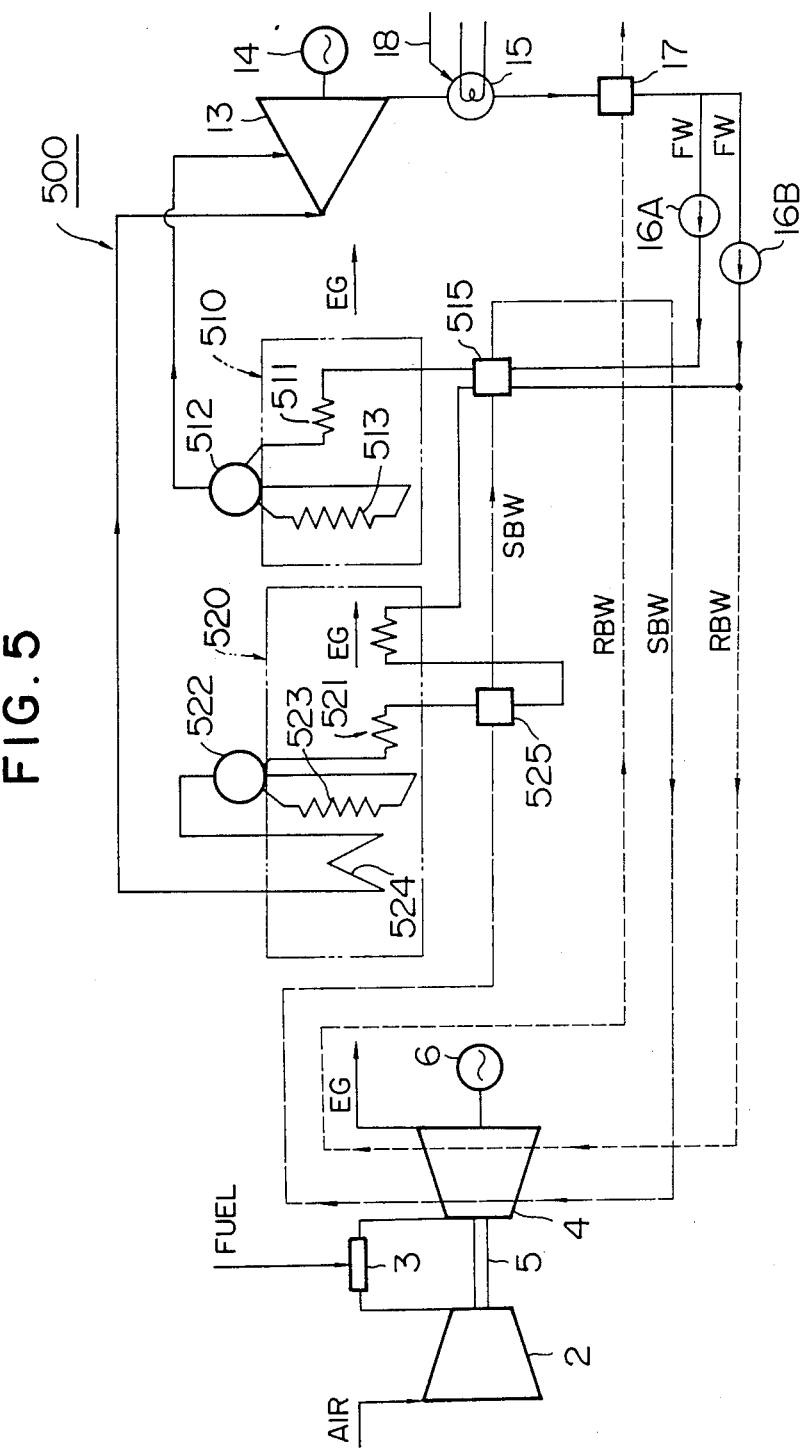

In FIG. 5, feed-water is supplied in parallel to respective economizers 511 and 521 through a heat exchanger 515. Another heat exchanger 525 is disposed in an intermediate portion of the economizer 521 associated with the higher interior pressure drum 522.

Figure 6:
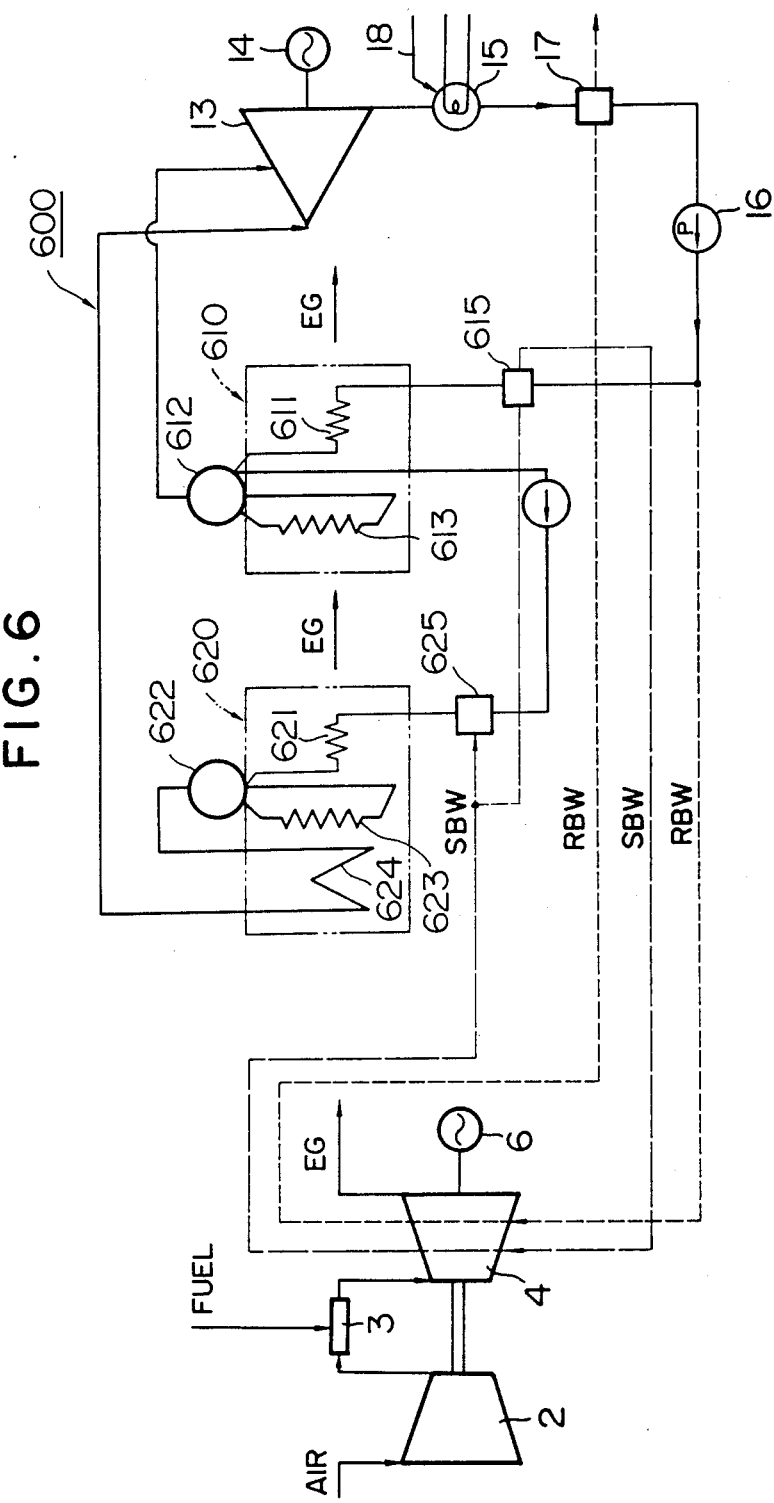

In FIG. 6, heat exchangers 615 and 625 are disposed in parallel along the flow of the high-temperature cooling water (SBW) from the gas turbine 4.

Figure 7:
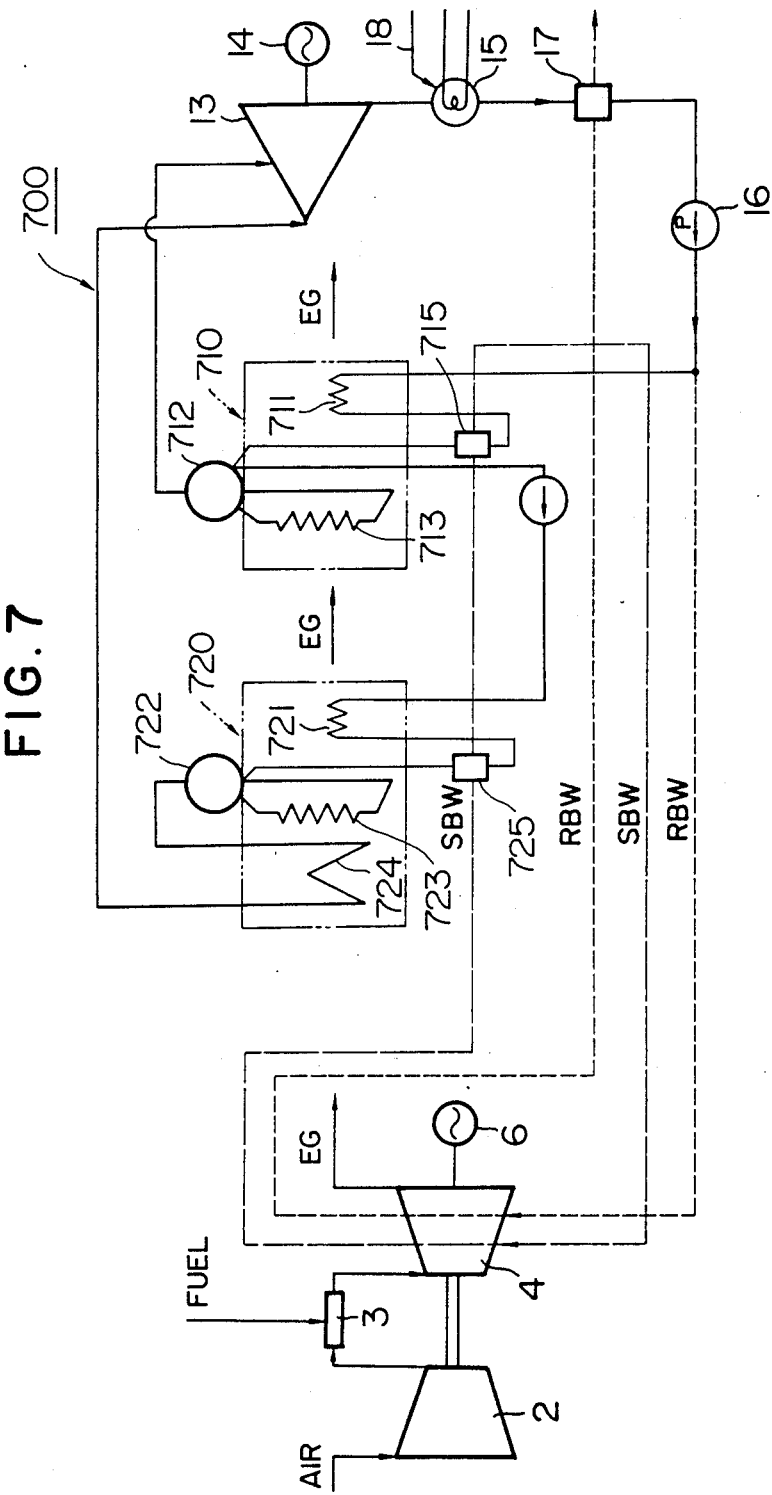

FIG. 7 shows a still further embodiment in heat exchangers 715, 725 are disposed between the drums 712, 722 and economizers 711, 721 of the respective boiler means 710, 720.

Figure 8:
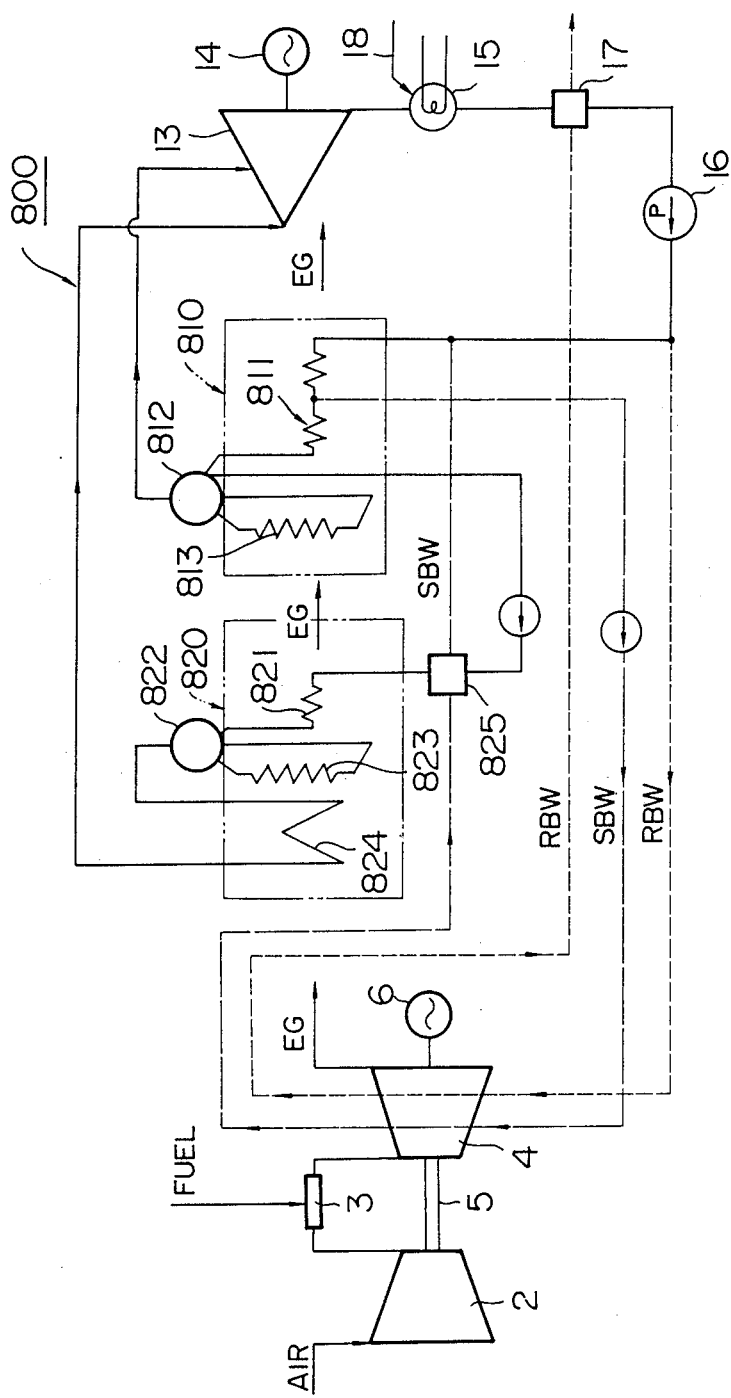

In FIG. 8, the cooling water (SBW) for cooling the stator blades is branched off from an intermediate portion of the economizer 811 associated with the lower interior pressure drum 812. Within the heat exchanger 825, the high-temperature cooling water (SBW) from the gas turbine 4 heats the feed-water to be delivered into the higher interior pressure drum 822 and, therefore, is merged into the feed-water to be delivered to the lower interior pressure drum 812.

According to the invention, heat exchangers are provided in advance of the drum of the respective boiler means so that the feed-medium to be fed to the drums are pre-heated by the high-temperature cooling medium heated by the blades of the gas turbine. Consequently, the amounts of vapor generated in the respective drums are increased and, at the same time, the heating load imposed on other heat source for pre-heating the feed-medium is decreased advantageously. Accordingly, the total combined efficiency in the electric power plant is substantially improved.

Figure 9:
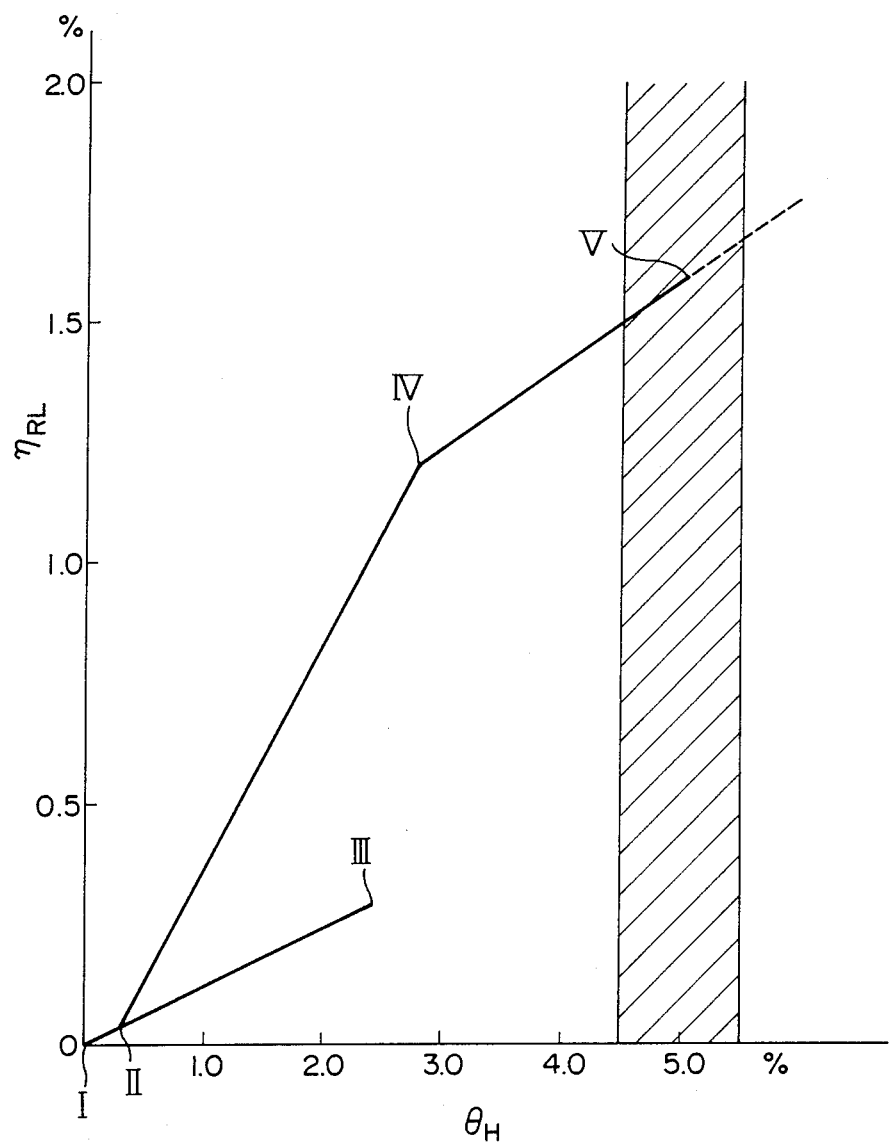
FIG. 9 is a graph showing how the total combined efficiency is increased relatively by the heat recovery system according to the invention.

In FIG. 9, the abscissa represent the ratio $\theta$ of the heat recovered from the cooling water heated by the gas turbine blades of the total heat input to the gas turbine, while the ordinate represents the relative improvement $\eta hd RL$ of the efficiency. The relative improvement $\eta_{RL}$ is defined by the following formula.

$$\eta_{RL} = \frac{\eta_T - \eta_N}{\eta_N} = \frac{\Delta\eta}{\eta_N}$$

where, where, $\eta hd N$ represents the net efficient of an electric power plant devoid of the heat recovery system and $\eta_T$ represents the total combined efficiency as attained when the heat recovery system is combined with the electric power plant.

$\eta_T$ is defined by the following formula.

$$\eta_T = \eta_{GT} + \eta_{HR}$$
$$= \frac{860\left[\frac{Kcal}{KW \cdot H}\right] \times \text{Electric Output } [kw]}{\text{Fuel Consumption}\left[\frac{kg}{H}\right] \times \text{heat Input}\left[\frac{kcal}{kg}\right]}$$

where, where, $\eta_{GT}$ represents the efficiency of the gas turbine, and $\eta_{HR}$ represents the efficiency of the heat recovery system.

Thus, the relative improvement $\eta_{RL}$ is an index showing the ratio of increment of the efficiency to the total combined efficiency as attained by the provision of the heat recovery system of the invention in any given electric power plant having a certain efficiency.

(I) When there is no heat recovery from the cooling water for the gas turbine blades, i.e. when $\theta_H$ equals to zero, the additional efficiency is zero accordingly. Namely, the relative improvement $\eta_{RL}$ is zero because the increment $\Delta\eta$ is zero ($\eta_T = \eta_N$). In this case, therefore, the efficiency is not increased.

(II) When the heat recovery is made only from the rotor blade cooling water, both of $\theta_H$ and $\eta_{RL}$ take only small values.

(III) When the feed-water to be delivered to the lower interior pressure drum is heated by not only the rotor blade cooling water but stator blade cooling water from the gas turbine, the relative improvement $\eta_{RL}$ is about 0.3% while the heat recovery ratio $\theta_H$ is about 2.4%. In this case, thereore, the total combined efficiency $\eta_T$ is given by $\eta_T = (1 + 0.003)\eta_N$, so that the efficiency is increased by an amount corresponding to 0.3% of the net efficiency.

(IV) When the condensed feed-water is heated by the rotor blade cooling water and the feed-water to be delivered to the higher interior pressure drum is heated by the stator blade cooling water, the heat recovery ratio $\theta_H$ and the relative improvement $\eta_{RL}$ are about 2.8% and about 1.2%, respectively. Thus, the recovery of the heat from the cooling water is not so increased beyond that attained in the case (III) mentioned above, however the total combined efficiency, expressed by $\eta_T = (1 + 0.012) \times \eta_N$, is increased appreciably as compared with the case (III).

(V) When the condensed feed-water is heated by the rotor blade cooling water, and the stator blade cooling water is usd for heating both of the feed-water to be delivered into the higher interior pressure drum and the feed-water to be delivered into the lower interior pressure drum, i,e. in case of the embodiments described above, the heat recovery ratio $\theta_H$ and the relative improvement $\eta_{RL}$ are about 5% and about 1.6%, respectively. These values are much higher than those attained in the cases (III) and (IV) mentioned above.

When either the feed-water to be delivered into the higher interior pressure drum or the feed-water to be delivered into the lower interior pressure drum is heated, the value of the heat recovery ratio $\theta_H$ is about 3% at the highest. It is, therefore, preferred to provide a heat exchanger in advance of or at an intermediate portion of each economizer. The value of the heat recovery ratio $\theta_H$ in the preceding embodiment remains within the hatched area in FIG. 9.

The points designated by the Roman numerals (I)-(V) show the respective conditions (I)-(V) in FIG. 9.

What is claimed is:

1. In a heat recovery system which is associated with an electric power plant having a compressor, a burner, a gas turbine in which stator blades thereof are cooled by a cooling medium, and a main genrator driven by said gas turbine, wherein the improvement comprises:
   at least two exhaust gas boiler means each of which includes an economizer, an evaporator, and a drum the interior pressure of which is different from that in the drum of other exhaust gas boiler means;
   a steam turbine;
   an additional generator driven by said steam turbine;
   a condenser;
   means for circulating a feed-medium condensed by said condenser throughout said heat recovery system, said feed-medium being substantially the same as said cooling medium; and
   a plurality of heat exchanger means in which said feed-medium is adapted to be heated up by said cooling medium which is heated through said gas turbine, each of said heat exchanger means being provided in said heat recovery system in advance of said drums of the respective exhaust-gas boiler means.

2. A heat recovery system as claimed in claim 1, wherein the rotor blades of said gas turbine are also cooled by said cooling medium, and wherein said cooling medium for said rotor blade is used to pre-heat said feed-medium to be delivered into said boiler means.

3. A heat recovery system as claimed in claim 1, wherein said heat exchanger means are disposed in parallel with each other along a flow of said cooling medium.

4. A heat recovery system as claimed in claim 1, wherein said heat exchanger means are disposed in series along a flow of said cooling medium.

5. A heat recovery system as claimed in claim 1, whrein one of said heat exchanger means is disposed in advance of said economizer associated with said drum having a higher interior pressure.

6. A heat recovery system as claimed in claim 5, wherein one of said heat exchanger means is disposed in advance of said economizer associated with said drum having a lower pressure.

7. A heat recovery system as claimed in claim 1, wherein one of said heat exchanger means is disposed at an intermediate portion of said economizer associated with said drum having a higher interior pressure.

8. A heat recovery system as claimed in claim 7, wherein one of said heat exchanger means is disposed at an intermediate portion of said economizer associated with said drum having a lower interior pressure.

9. A heat recovery system as claimed in claim 1, wherein one of said heat exchanger means is disposed at a portion of said heat recovery system between said drum having a higher interior pressure and said economizer associated therewith.

10. A heat recovery system as claimed in claim 7, wherein another heat exchanger means is disposed in advance of said economizer associated with said drum having a lower interior pressure as well as in advance of said economizer associated with said drum having a higher interior pressure as viewed in the direction of flow of said feed-medium, so that not only the feed-medium directed to said lower interior pressure drum but the feed-medium directed to said higher interior pressure drum is heated up.

11. A heat recovery system as claimed in claim 2, wherein said stator blades of said gas turbine are cooled by a cooling medium branched out from an intermediate portion of said economizer associated with said drum having a lower interior pressure.

12. A heat recovery system associated with a gas turbine in which stator blades thereof are cooled by a cooling medium, said system comprising:
   high pressure boiler means for generating high pressure steam by exhaust heat energy from said gas turbine;
   low pressure boiler means for generating low pressure steam by exhaust heat energy from said gas turbine;
   a steam turbine driven by the steam from both of said boiler means;
   means for condensing exhaust steam from said steam turbine into condensation;
   means for supplying both of said boiler means with said condensation as feed water;
   heat exchanger means provided upstream, respectively, of said high pressure boiler means and said low pressure boiler means with respect to a direction of flow of said condensation; and
   means for circulating the cooling medium from said gas turbine first through the heat exchanger means associated with said high pressure boiler means, then through the heat exchanger means associated with said low pressure boiler means, and finally through said stator blades.

13. A heat recovery system according to claim 12, further including:
   an additional heat exchanger means disposed in the flow of said condensation between said condensing means and said low pressure boiler means; and
   means for supplying said cooling medium to rotor blades of said gas turbine and from said rotor blades to said additional heat exchanger means so as to pre-heat said condensation.

* * * * *